No. 858,148. PATENTED JUNE 25, 1907.
J. J. CALLAHAN.
BAND SAW GUIDE.
APPLICATION FILED SEPT. 15, 1906.
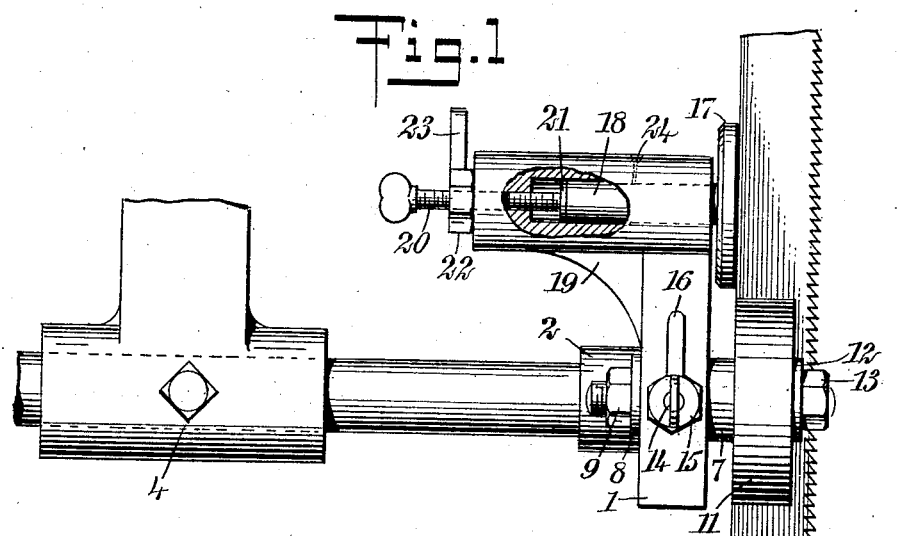
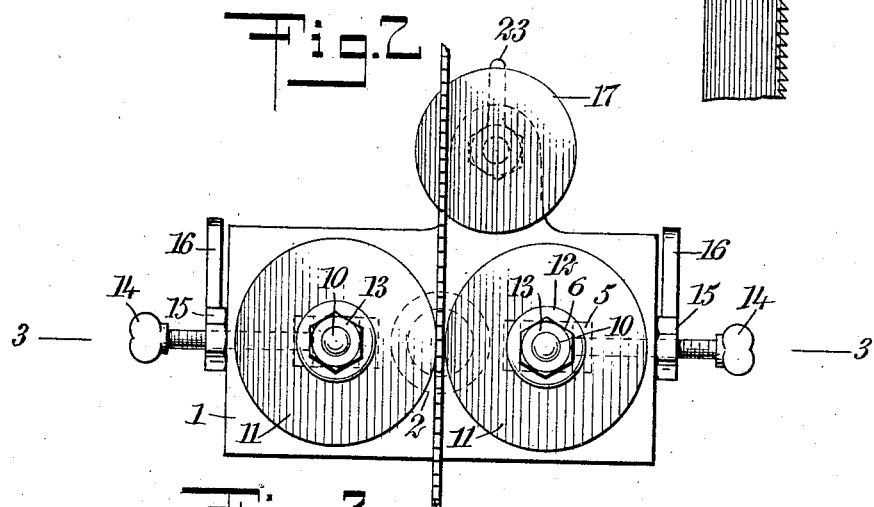
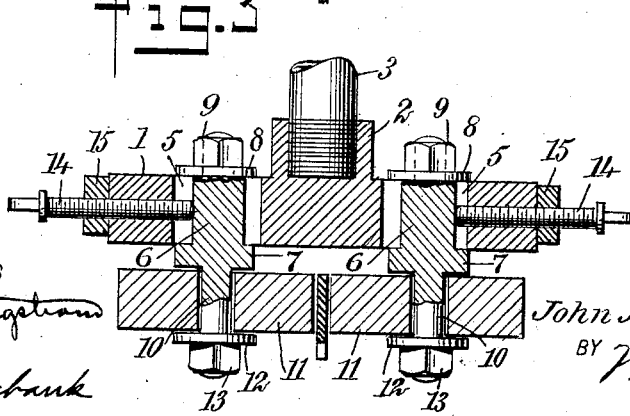
WITNESSES
INVENTOR
John J. Callahan
BY
ATTORNEYS
THE NORRIS PETERS CO., WASHINGTON, D. C.

UNITED STATES PATENT OFFICE.

JOHN JOSEPH CALLAHAN, OF ST. JOHNS, NEWFOUNDLAND.

BAND-SAW GUIDE.

No. 858,148.        Specification of Letters Patent.        Patented June 25, 1907.

Application filed September 15, 1906. Serial No. 334,716.

*To all whom it may concern:*

Be it known that I, JOHN JOSEPH CALLAHAN, a subject of the King of Great Britain, and a resident of St. Johns, Newfoundland, have invented a new and Improved Band-Saw Guide, of which the following is a full, clear, and exact description.

This invention relates to guides for band saws used in wood working and other analogous arts, and its object is to provide a guide for a band saw which is as free from friction as it is possible, and in which the band saw is held in its proper position and which is inexpensive to make and easy to adjust.

Reference is to be had to the accompanying drawings forming a part of this specification, in which similar characters of reference indicate corresponding parts in all the figures, in which Figure 1 is a side elevation of my improved saw guide, a portion thereof being broken away; Fig. 2 is a front elevation; and Fig. 3 is a horizontal cross section on the line 3—3 of Fig. 2.

In my improved saw guide I employ a main supporting plate 1, having a collar 2 on its back side into which is screw-threaded a rod 3 by which the guide may be attached to the frame or other stationary part of the machine, as for instance, by being held within the clamp as shown at 4 in Fig. 1. This plate 1 is provided with two rectangular openings 5—5 of substantially the same width and extending in the opposite direction from the point on the plate adjacent which it is desired to hold the saw. Extending through each of these openings 5 is a square bolt 6 of substantially the same width as the rectangular opening 5 and adapted to move longitudinally through the length of the opening but being prevented from turning or rotating therein. Each square bolt 6 has a collar 7, abutting against the face of the plate 1 and of a width substantially greater than the width of the opening 5, and the other end of each bolt has a washer 8 and nut 9, whereby the bolt may be rigidly held in place and the collar 7 and washer 8 tightly grip the opposite faces of the plate 1. Each of the square bolts, beyond the collar 7, is cylindrical in cross section and constitutes a spindle 10 upon which the guide wheels 11 are supported. These guide wheels 11 are held on the spindles in any suitable manner, as for instance, by washers 12 and nuts 13, and the two guide wheels are held a distance apart substantially equal to the thickness of the saw.

To accommodate for saws of different thicknesses, the guide wheels may be adjusted to different distances apart by the movement of the square bolts 6 within the rectangular openings 5. For facilitating this adjustment, I preferably provide the plate 1 with thumb screws 14, extending into it from opposite sides and engaging with the square bolts 6. By turning these screw bolts 14, the bolts 6 may be adjusted to any point and the guide wheels 11 brought as closely together as it is desired. To prevent the accidental rotation of the screw bolts or to prevent them from working loose, I preferably provide locking nuts 15, having arms 16 by which they may be more easily rotated. These two guide wheels 11, supported in the manner above described, guide the saw and prevent any lateral movement of the same; but in order to prevent the saw from being forced back between the wheels against the plate 1, I provide a guide disk 17, carried by or integral with a spindle 18, fitting within a socket on a bracket 19 carried by the plate. This guide disk 17 and the spindle 18 are free to rotate within the socket and the face of the guide disk normally rests against the back of the saw. For adjusting the guide disk 17 I provide a thumb screw 20, threaded into the outer end of the bracket and having its inner end in engagement with a small steel disk 21, fitting aginst the end of the spindle 18. A suitable locking nut 22 may be employed for holding the thumb screw 20 in its adjusted position and this locking nut may also be provided with an arm 23 similar to the arms 16. The bracket 19 is preferably provided with an oil opening 24 whereby the spindle 18 may be lubricated.

By the use of my improved band saw guide very little friction is encountered, as all the parts which are in engagement with the saw are free to move therewith, and as the two guide wheels may be adjusted to any distance apart desired and the position of the guide disk 17 may be also freely adjusted, it is evident that the guide may be used in connection with saws of any size. Further adjustment may be secured by the movement of the entire guide in the clamp 4.

The guide disk 17 is preferably located slightly at one side of the saw, so that the back of the saw does not pass over the center of the guide disk. In this manner, the guide disk is caused to freely rotate and the back of the saw engages therewith.

Many minor changes may be made in the specific device above described without departing from the spirit of my invention.

Having thus described my invention, I claim as new and desire to secure by Letters Patent;

1. A band saw guide, comprising a suitable support provided with two rectangular openings, a square bolt extending through each of said openings, screw bolts in engagement with the sides of each of said square bolts for laterally adjusting the position of said square bolts within said openings, a guide roller rotatably mounted on the end of each of the square bolts, said guide rollers adapted to engage with the opposite sides of a saw, and a guide disk carried by said support and adapted to engage with the back of the saw.

2. A band saw guide, comprising a plate, a rod secured to said plate, means for securing said rod to the frame of a machine, said plate having two rectangular openings, square bolts extending through said openings, said bolts being provided with collars in engagement with one face of the plate and washers in engagement with the opposite face, screw bolts in engagement with the oppositely-disposed faces of the square bolts for laterally adjusting the position of said square bolts within the openings, means for locking the screw bolts in their adjusted positions, a spindle on the end of each square bolt and integral therewith, and guide rollers supported on said spindles adapted to engage with opposite sides of the saw.

3. A band saw guide, comprising a plate, a rod secured to said plate, means for securing said rod to the frame of a machine, said plate having two rectangular openings, square bolts extending through said openings, said bolts being provided with collars in engagement with one face of the plate and washers in engagement with the opposite face, screw bolts in the plane of the plate and intersecting the rectangular openings for contacting with the lateral surfaces of the square bolts and adjusting their position within said openings, lock nuts on said screw bolts, a spindle on the end of each square bolt and integral therewith, guide rollers rotatably mounted on said spindles and adapted to engage with the opposite sides of a saw, and a guide disk supported upon said plate and adapted to engage with the back of the saw.

4. A band saw guide, comprising a plate, a rod secured to said plate, means for securing said rod to the frame of a machine, said plate having two rectangular openings, square bolts extending through said opening, said bolts being provided with collars in engagement with one face of the plate, and washers in engagement with the opposite face, screw bolts in the plane of the plate and intersecting the rectangular openings for contacting with the lateral surface of the square bolts and adjusting their positions within said openings, locking nuts on said screw bolts, a spindle on the end of each square bolt and integral therewith, guide rollers rotatably mounted on said spindle and adapted to engage with the opposite sides of a saw, a bracket carried by said plate and having a socket, a guide disk, a spindle rigidly secured to said disk and mounted within said socket, a screw bolt carried by said bracket and adapted to engage with the end of the spindle for adjusting the longitudinal position thereof, and means for locking the screw bolt in its adjusted position.

In testimony whereof I have signed my name to this specification in the presence of two subscribing witnesses.

JOHN JOSEPH CALLAHAN.

Witnesses:
JAMES F. ARMSTRONG,
THOMAS DUNN.